(Model.)
W. SHIMP.
TWO WHEELED VEHICLE.
No. 290,123. Patented Dec. 11, 1883.
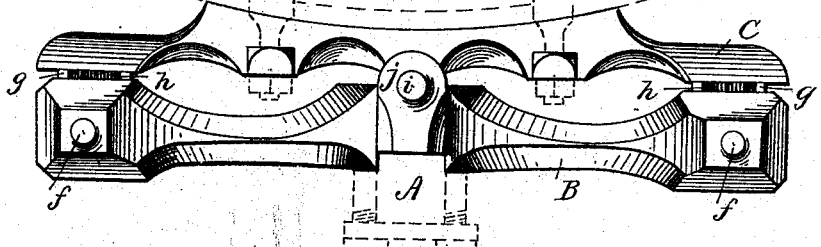
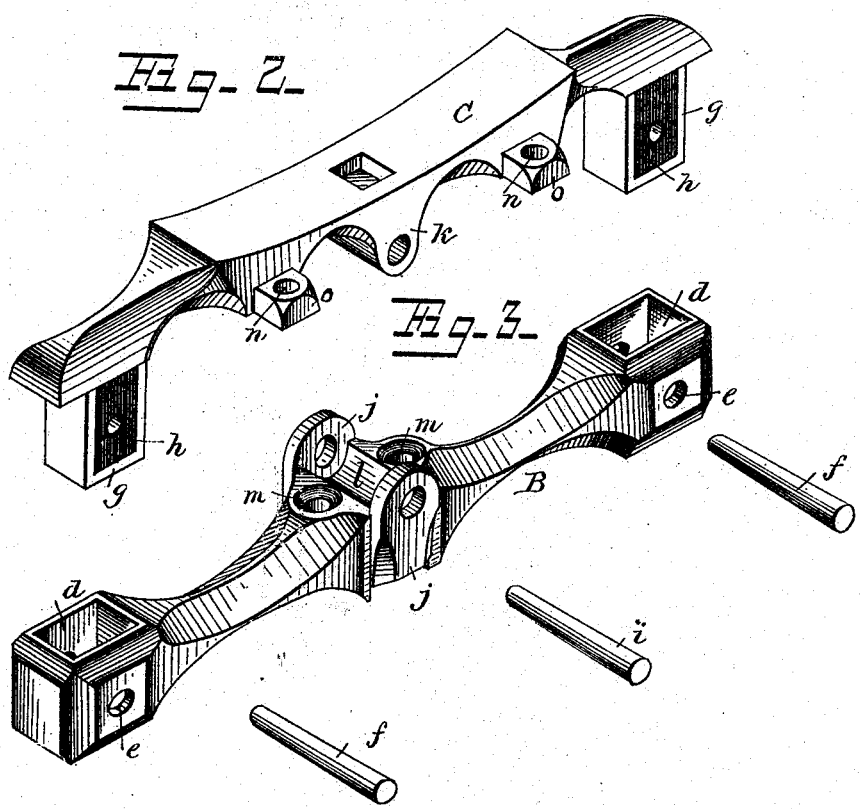
WITNESSES
F. L. Ourand
J. C. Wildman
INVENTOR
William Shimp
by John J. Halsted & Son
his Attorneys

UNITED STATES PATENT OFFICE.

WILLIAM SHIMP, OF NAPERVILLE, ILLINOIS.

TWO-WHEELED VEHICLE.

SPECIFICATION forming part of Letters Patent No. 290,123, dated December 11, 1883.

Application filed June 7, 1883. (Model.)

*To all whom it may concern:*

Be it known that I, WILLIAM SHIMP, of Naperville, in the county of Du Page and State of Illinois, have invented certain new and useful Improvements in Two-Wheeled Vehicles or Road-Carts; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to overcome or entirely do away with that motion in two-wheeled vehicles known as the "horse motion;" and the nature of the invention will be readily understood from the description below; and it consists in a special construction and arrangement of devices secured between the axle and the springs, and which I call an "equalizer."

In the drawings, Figure 1 shows an elevation of my invention; Fig. 2, a perspective view of the upper or lower part of the equalizer detached, and Fig. 3 a perspective view of the lower part or bar on which this lever works.

A represents an axle. B is a bar, which is clipped to the axle; C, the lever, which is fulcrumed on the center of this bar; and this bar is to be clipped to the spring which is above it. The bar B has at each end a box, slot, or opening, d, and holes e in such slot to receive a bolt or pin, f. The equalizing-lever C has at each end a pocket, g, and this pocket, as also the openings d, may be of any desired shape, but adapted for each other. In each pocket is placed or fitted a piece of rubber, h, having a hole through it to receive the bolt or pin f, which, as before stated, is inserted in the holes e and extends through the rubber in the pocket. A fulcrum-pin, i, connects the center of the lever to the bar, such pin being passed through the ears j of the bar and through the central rocker portion, k, of the lever, this rocker preferably lodging in a transversely-grooved part, l, of the bar. The holes m m in the bar are provided to receive clips which are to secure the bars to the axle, and the holes n n in the pieces o o, inserted in the lever, are to receive the clips which fasten the levers to their respective springs. It will be understood that one of these equalizers is to be placed under each side spring, whether such spring be an elliptic, semi-elliptic, or of other form.

To adapt this device for proper action when applied to the vehicle, the pieces or blocks of rubber are fitted into the pockets. Then one end of the lever C being pressed downward to its full limit, or closely upon the end of the bar, will bring the hole in the rubber to coincide with the holes e e. The pin or bolt f is then inserted through these holes and the rubber. The opposite end of the lever is then similarly pressed down close upon the opposite end of the bar, and a pin or bolt inserted to hold these ends and their rubber block to place. This action, as will be evident, served to compress the rubber which was first inserted; and when both pins have been thus inserted through their respective rubbers, the rubbers will act equally, and both ends of the lever will be a little raised above the bar, and the elasticity of the rubber will permit the up-and-down motion of the thills of the vehicle without its affecting the motion of the body of the vehicle. In other words, the up-and-down movement of the thills expends itself on the bar B, which cannot impart it to the lever, and consequently not to the springs or body.

The action of this device is also very silent, the compressed rubber blocks not permitting any loose play of the parts.

If desired, the device may be attached to the thills, and either forward or rearward of the axle, by means of pieces bolted to or cast onto the bar, and in this way the bar may be fastened both to the axle and to the thills.

The device may be made of malleable or of wrought-iron.

I claim—

1. In combination, the bar B, having openings or boxes d at each end, and the equalizing-lever C, centrally fulcrumed on said bar, and provided at each end with a pocket, g, for containing fixed rubber blocks, said pockets and rubber blocks adapted to enter the openings d in the bar B and be secured therein, substantially as described.

2. The equalizing device described, adapted to be placed between the body-springs and the axle or thills, consisting of the lever C, adapted to be clipped to the springs of the vehicle, and its supporting-bar B, adapted to be clipped to the axle or to the axle and thills, and the rubber blocks inserted in the pockets *g* and within the openings at the ends of the bar, and there secured in a compressed state by pins passing through the bar, rubber, and pockets.

WILLIAM SHIMP.

Witnesses:
A. J. KING,
M. W. SOUTHWORTH.